Jan. 9, 1945.    S. S. COOK ET AL    2,367,099
POWER INSTALLATION
Filed Jan. 6, 1943    6 Sheets-Sheet 4

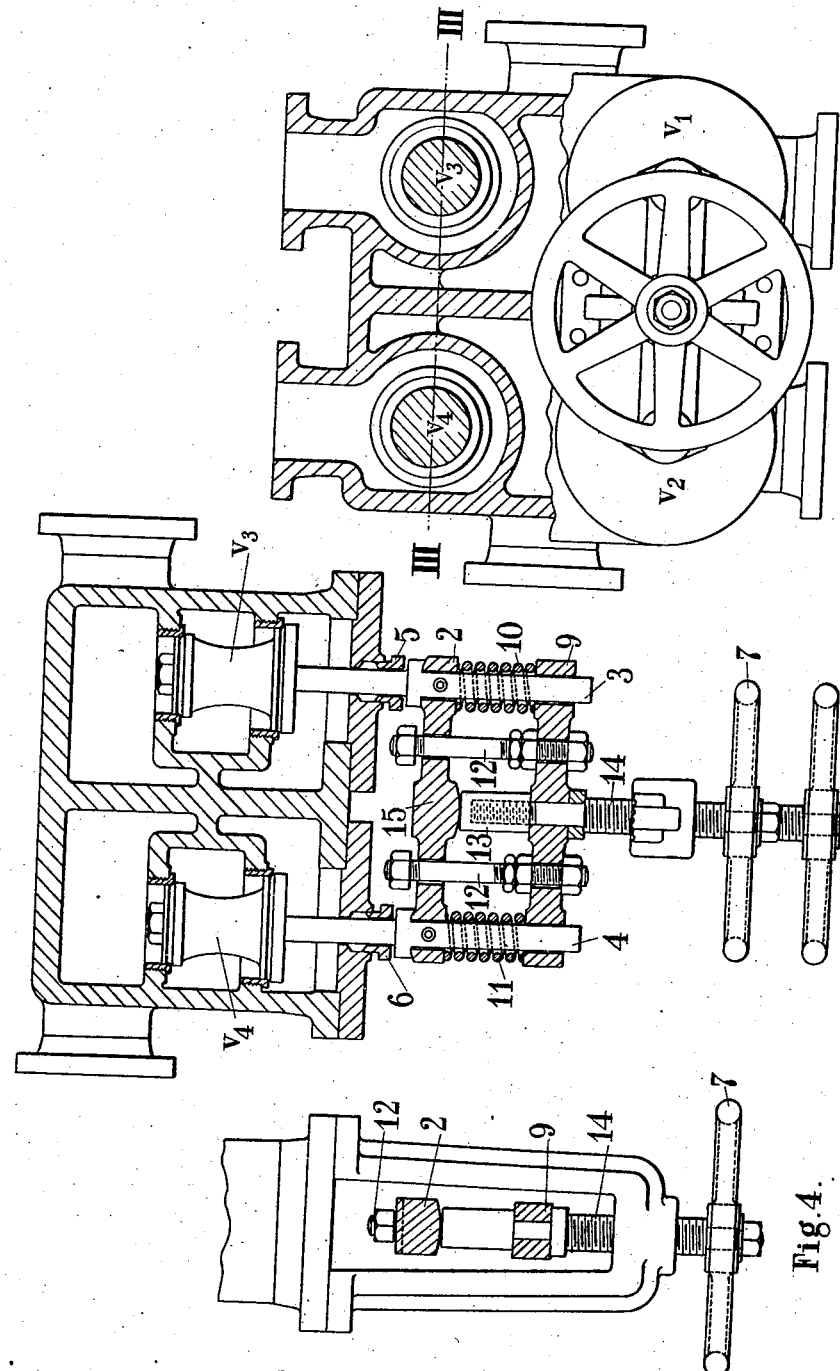

INVENTORS
Stanley Smith Cook
BY Louis Mortimer Douglass
Sawyer & Kennedy
ATTORNEYS Jan. 9, 1945. S. S. COOK ET AL 2,367,099
POWER INSTALLATION
Filed Jan. 6, 1943 6 Sheets-Sheet 5

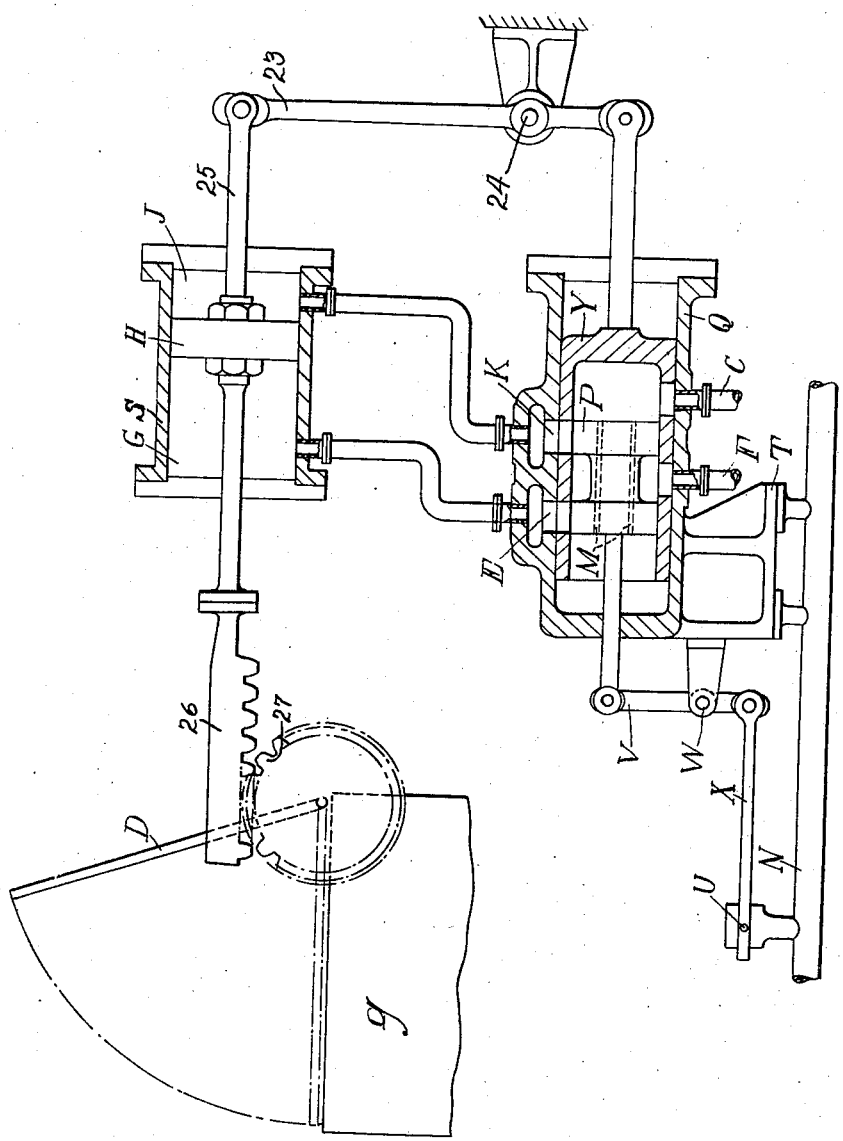

Patented Jan. 9, 1945

2,367,099

UNITED STATES PATENT OFFICE 2,367,099

POWER INSTALLATION

Stanley Smith Cook and Louis Mortimer Douglas, Wallsend-on-Tyne, England, assignors to The Parsons Marine Steam Turbine Company Limited, Wallsend-on-Tyne, England Application January 6, 1943, Serial No. 471,390
In Great Britain November 18, 1941

6 Claims. (Cl. 60—73)

This invention relates to elastic fluid marine power installations embodying ahead and astern turbines of the kind in which steam is initially superheated and then reheated at some intermediate stage of its expansion.

When such installations operate with a varying load, in certain conditions of working it is necessary to protect the reheater and any steam passing therethrough from attaining too high a temperature. For instance, in normal full power ahead operation steam from the superheater passes through a turbine or turbines wherein its pressure and temperature are reduced before it passes through the reheater, but when going astern the steam is not returned from the turbine system to the reheater so that unless other provision is made there is under these conditions no flow through the reheater which would consequently be liable to attain an excessive temperature.

Proposals have been made to meet these conditions, for example, in British Patent No. 416,091, in which steam directed from the superheater to the astern turbine is first passed through a reducing valve and superheater wherein its pressure and temperature are reduced and then passed through the reheater on its way to the astern turbine.

The main object of the present invention is to provide a simplified means of overcoming the above condition, i. e., of protecting the reheater from overheating under conditions in which such overheating is liable to occur.

The present invention consists briefly in an elastic fluid power installation of the kind indicated above wherein steam from the superheater directed to the astern turbine is caused to pass on its way thereto in superheated condition through the reheater and the heating applied to the reheater is reduced.

Referring to the accompanying diagrammatic drawings—

Figure 2 is a front view partly in cross section of a convenient arrangement of the control valves.

Figure 3 is a sectional plan of Figure 2 on the line III—III thereof.

Figure 4 is a side view partly in section of part of Figure 3.

Figure 10 illustrates means for regulating the damper position in accordance with the temperature of reheater outlet steam.

Figure 1:
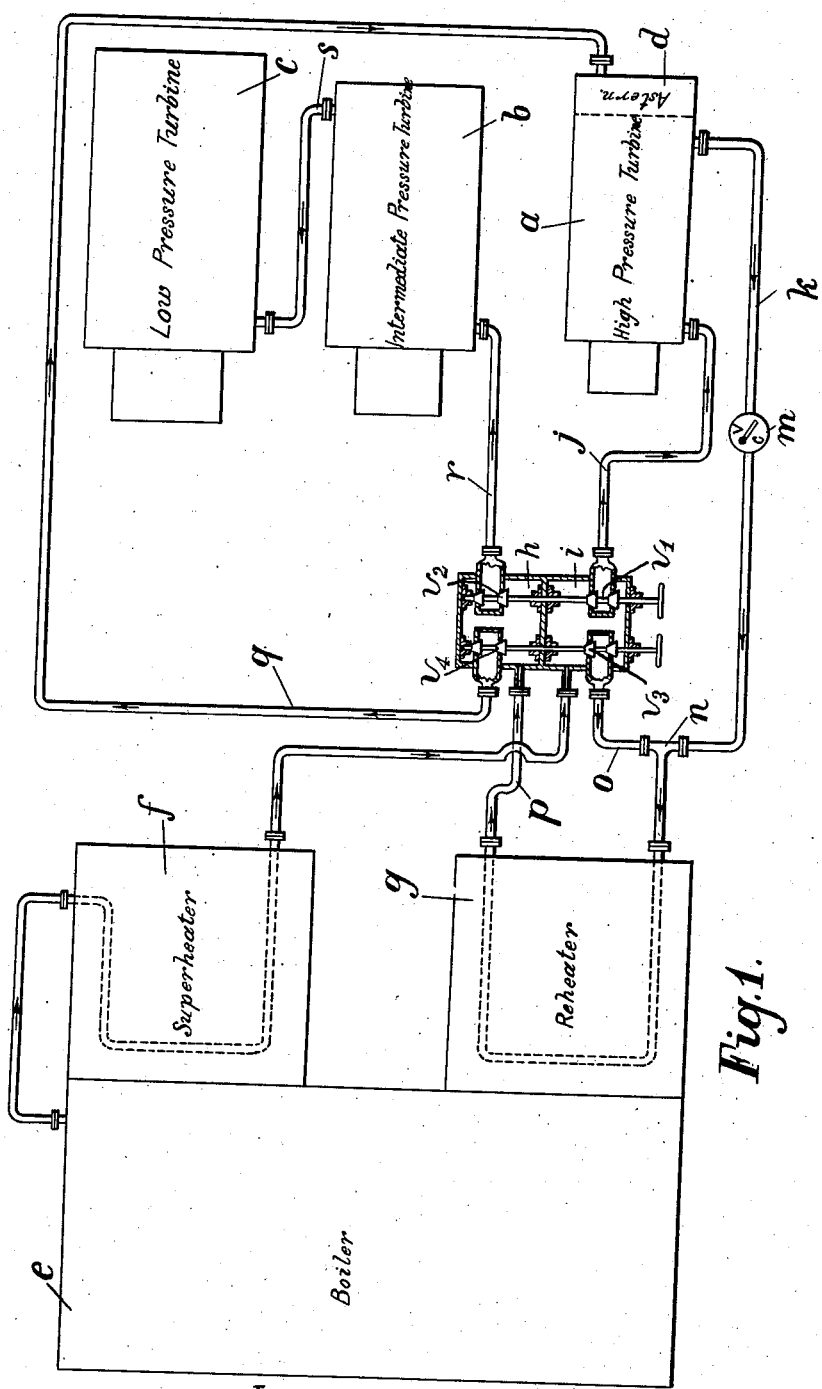
Figure 1 shows one convenient arrangement embodying the present invention.

In carrying the invention into effect in one form illustrated by way of example in Figure 1 as applied to a marine installation employing a high-pressure turbine $a$, an intermediate-pressure turbine $b$, a low-pressure turbine $c$ and an astern turbine $d$, we provide a boiler $e$ with superheater $f$ and reheater $g$. Steam from the boiler $e$ passes by way of the superheater $f$ to the lower portion of a valve chest having an upper compartment $h$ and lower separate compartment $i$.

The valve chest contains two pairs of valves, one pair $V_1$, $V_2$ for ahead control and the other pair $V_3$, $V_4$ for astern control and each valve is conveniently of double-beat type.

As regards each pair of valves the lower valve is contained within the lower compartment and the upper valve is contained in the upper compartment, the valves in each pair being mounted on a common operating spindle so as to be simultaneously operable. A steam connection $j$ is provided from the lower compartment—under control of the lower ahead valve $V_1$—to the high pressure turbine $a$ whence a further connection $k$ leads by way of a non-return valve $m$ to a steam union $n$ communicating with the reheater $g$. The remaining connection $o$ to the steam union $n$ is taken from the lower compartment $i$ under the control of the lower astern valve $V_3$.

A connection $p$ is made from the outlet of the reheater $g$ to the upper valve chest compartment $h$ from which two further controlled steam connections $qr$ are made, one ($r$) being under control of the upper ahead valve $V_2$ to the intermediate pressure turbine $b$ and the other ($q$) being under control of the upper astern valve $V_3$ to the astern turbine $d$.

The outlet of the astern turbine is connected directly or through a low pressure astern turbine to a condenser (not shown) and the outlet $s$ of the intermediate pressure turbine $b$ is connected to the low-pressure turbine $c$, the outlet from which is also connected to the condenser.

The reheater $g$ is provided with damping means (not shown) whereby the heating of the reheater tubes can be reduced as desired, this operation being performed either automatically in conjunction with the opening of the astern valves $V_3$, $V_4$ or in accordance with the temperature of the steam entering or leaving the reheater or manually.

In operation, when the ahead valves $V_1$, $V_2$ are open and the astern valves $V_3$, $V_4$ closed, steam passes from the superheater $f$ to the high-pressure turbine $a$, thence through the non-return valve $m$, reheater $g$, intermediate-pressure turbine $b$ and low-pressure turbine $c$. When the astern valves $V_3$, $V_4$ are open and the ahead valves $V_1$, $V_2$ are closed, steam from the superheater $f$ passes through the reheater $g$, which is now damped, either automatically or manually, and thence passes to the astern turbine $d$; steam is prevented by the non-return valve $m$ from passing backwards from the reheater $g$ through the high-pressure turbine $a$.

If desired, when running astern the superheater $f$ may also be furnished with damping means so that the heating of the superheater may also be reduced under these conditions.

In practice it is preferred that each pair of astern and ahead control valves be mounted on separate spindles and simultaneous operation of the valves of each pair ensured by the provision of suitable means.

According to one example as illustrated in Figures 2 to 4, such means consist of a rigid crossbar 2 connecting each pair of valve spindles 3, 4 where they project through glands 5, 6 in the valve chest casing.

As regards each pair of valves a single operating hand wheel 7 is provided on a screwed shaft 14 bearing against a further crossbar 9 loosely carried upon the valve spindles 3, 4. Compression springs 10, 11 and link bolts 12 are provided between the two crossbars 2, 9 and the arrangement is such that starting from the full open position of the valves as the hand wheel is turned to close the valves the crossbar 9 moves and transmits closing force to the crossbar 2 by way of the compression springs 10.

When the valves reach their seatings further movement of the crossbar 9 further compresses the springs 10 and 11 and tightly closes the valves upon their seatings; finally, a cap 13 on the hand wheel screw 14 bears against an abutment 15 at the centre of the crossbar 2. When opening movement is given to the hand wheel 7, the crossbar 9 moves away from the crossbar 2 and the compression springs 10, 11 extend until the link bolts 12 become operative and the valves are drawn away from their seatings.

Each pair of valves, that is to say, both ahead and astern valves, have a similar operating gear with a single hand wheel.

Figure 6:
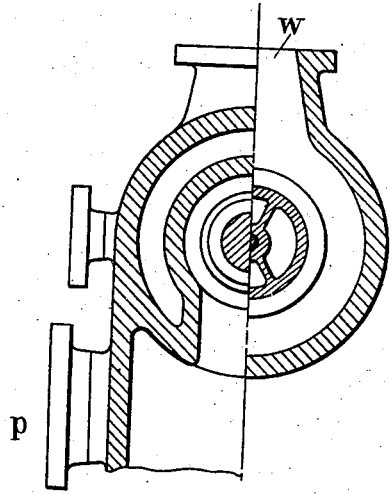
Figure 6 is a vertical sectional view taken half on the one line and half on another line through Figure 5.
Figure 7:
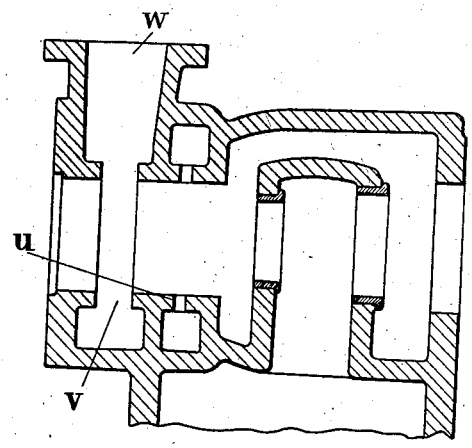
Figure 7 is a sectional view of part of the casting shown in Figures 5 and 6.
Figure 5:
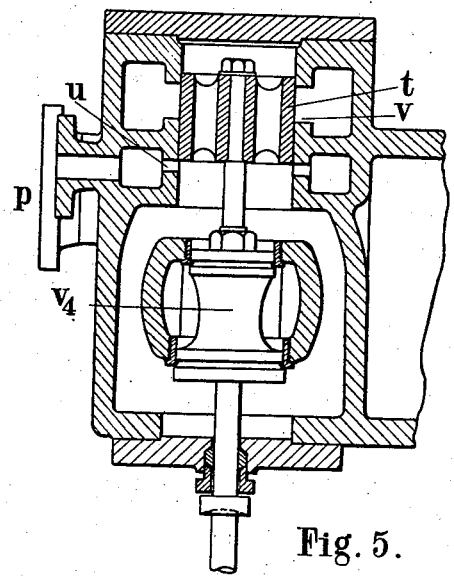
Figure 5 is a sectional plan view of part of a modified valve arrangement.

According to an alternative constructional arrangement illustrated in Figures 5 to 7, the astern valves $V_3$, $V_4$ incorporate a further shut-off and a leak-off piston valve $t$ operating to control a leak-off port $u$ and a port $v$ communicating with the outlet $w$ leading to the astern turbine $b$. The operation of the leak-off valve $t$ is similar to that of the valve $t$ of British Patent No. 319,818.

Figure 8:
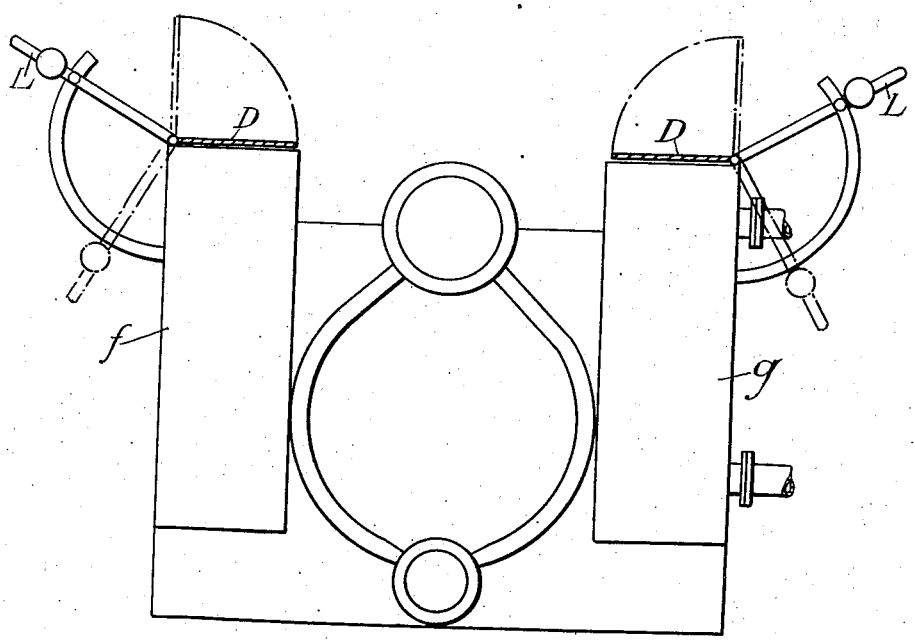
Figure 8 is a diagrammatic view of a boiler having a superheater and reheater each provided with manual means for varying the rate of flow of flue gases therethrough.

An example of the manner in which the reduction of reheater temperature may be performed manually is illustrated in Figure 8, which shows a boiler of the type described in the British patent specification No. 539,614. In this figure $g$ is the reheater and $f$ the superheater, each provided with a damper D for varying the rate of flow of flue gases therethrough. The dampers are each provided with a hand lever L by which they are manually operated, the full and dotted lines indicating the fully closed and the fully open positions respectively.

Figure 9:
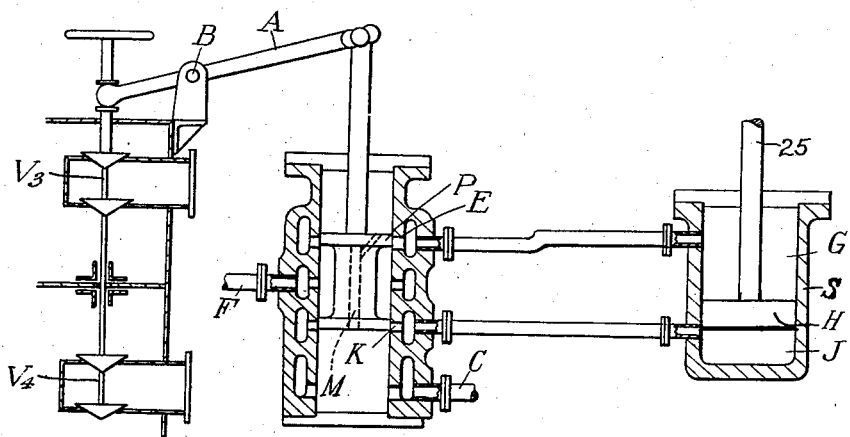
Figure 9 illustrates part of an arrangement embodying a servo-motor to control a damper or dampers operated in accordance with the position of two astern control valves.

Figure 9 illustrates means for controlling the operation of a servo-motor S in accordance with the position of the astern control valves $V_3$ and $V_4$, the servo-motor S providing means for opening and closing the damper or dampers. The piston P of a pilot valve is connected by rocking lever A with fixed pivot B, to valve $V_3$ so that its position is determined by the latter.

Fluid under pressure is supplied to the pilot valve at F and is drained therefrom at C. In the position shown with valves $V_3$, $V_4$, closed the pilot valve is so disposed that pressure fluid passes through port E to the space G on one side of the piston H of the servo-motor while the space J on the other side is connected by port K to drain C. The pressure fluid acting on the piston H presses it into the position shown which corresponds to the fully open position of the dampers. When the valves $V_3$, $V_4$, are opened the pilot valve piston P is moved into the position whereby pressure fluid passes by port K to the space J whilst space G is connected by port E and duct M to drain C so that the piston H is moved to the opposite end of the servo-motor cylinder to close the dampers.

In Figure 9 the width of the piston portions of pilot valve P is substantially the same as the width of the ports E and K and the laps are very small so that a small opening movement of the valve $V_3$ effects the change-over of the pressure fluid connections to operate the servo-motor and close the damper. The mechanism for operating the pilot valve piston P and opening valve $V_3$ may have a lost-motion device so arranged that the valve P is operated and the damper closed before $V_3$ is actually open. Alternatively the pilot valve may be operated by the ahead valves $V_1$ and $V_2$ so that the damper is closed as soon as the ahead valves are closed. In this case preferably both the superheater and reheater dampers are closed when the ahead valves are closed.

Figure 10 illustrates means for regulating the position of the damper in accordance with the temperature of the steam leaving the heater. The steam from the heater passes through pipe N to which the pilot valve casing Q is rigidly attached at T. The pilot valve piston P is connected by rocking lever V with fixed pivot W, to rod X which is rigidly attached to the pipe N at U so that relative expansion of pipe N between the points T and U will cause the piston P to move to the right relatively to its casing Q. Pressure fluid is supplied to the latter at F and is drained therefrom at C. The ports E and K of the pilot valve are formed in a sleeve Y which is connected by rocking lever 23 with fixed pivot 24, to rod 25 carrying the piston H of the servo-motor operating the damper D. The motion of the servo-motor is communicated to the damper by means of a rack 26 attached to spindle 25 operating a pinion 27 mounted on the spindle of the damper.

At all temperatures below the normal the pilot valve P is to the left of its null position and pressure fluid passes through port E to space G while space J is connected by port K to the drain C so that the piston H is to the extreme right and the damper fully open. When the temperature reaches the normal the piston P reaches the null position and any further increase in temperature causes it to move to the right so that pressure fluid passes by port K to space J and fluid in space G passes to the drain C through port E and ducts M. The piston H is therefore moved to the left closing the damper and the motion communicated through lever 23 to the sleeve Y moves the latter to the right. When the sleeve Y reaches the null position in relation to piston P the flow of pressure fluid to and from the servo-motor ceases and the closing motion of the damper is arrested. A reduction of the temperature of the steam in pipe N causing the latter to shorten will move pilot valve P to the left of the null position causing pressure fluid to flow through port E to space G and from space J and port K to drain C, thus causing an opening movement of the damper.

The pipe N is lagged and isolated from the rest of this apparatus so,that the pipe will attain substantially the temperature of the steam therein while the rest of the apparatus remains at normal temperature.

Figure 11:
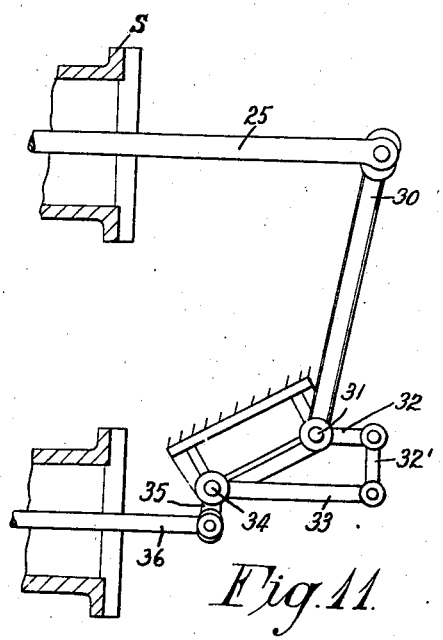
Figures 11 and 12 show a system of linkages which may conveniently be employed in conjunction with the apparatus shown in Figure 10.
Figure 12:
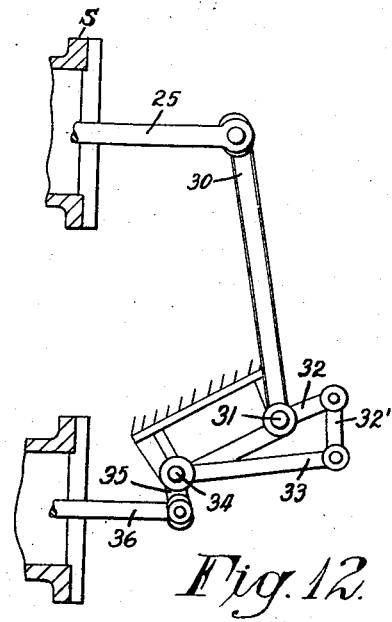

As shown the movement communicated to the pilot valve P is by a simple lever V and the "follow up" motion of sleeve Y is by a simple lever 23 but in order to obtain reasonably large motion of piston H with the small movement practically obtainable by differential thermal expansion of pipe N and rod X, etc., either the movement of P must be much more amplified or the motion of Y much more reduced than is practicable with a single lever. Figures 11 and 12 show a system of linkage for effecting a considerable reduction of the motion of Y relatively to H, this being the preferred method. The long arm 30 of the bell crank lever on a fixed pivot 31 is connected to the piston rod 25 of the servo-motor while the short arm 32 is connected by link 32' to the long arm 33 of another bell crank lever with a fixed pivot 34, the short arm 35 being connected to the stem 36 of the sleeve Y. Figure 11 shows this linkage with the damper fully open and Figure 12 with the damper fully closed.

In installations in accordance with this invention the passing of the steam from the superheater in its superheated condition through the reheater together with the reduction of the heating applied to the reheater provides a simple and effective means of preventing the reheater or the steam passing therethrough from attaining an excessive temperature.

What is claimed is:

1. An elastic fluid marine turbine power installation embodying an ahead turbine, an astern turbine, a superheater for initially heating the elastic fluid for the ahead turbine, a reheater for reheating exhaust steam at some intermediate stage of its expansion, in combination with means for directing elastic fluid from the superheater in superheated condition through the reheater to the astern turbine and means for reducing the heating applied to the reheater.

2. An elastic fluid power installation as claimed in claim 1, in combination with means operating automatically in conjunction with the opening of the astern valves for reducing the heating of the reheater.

3. An elastic fluid power installation as claimed in claim 1, in which means are provided for damping of the superheater.

4. An elastic fluid power installation as claimed in claim 1, having in combination a pair of simultaneously operable valves for ahead running, one controlling supply of superheated steam to a high pressure turbine and the other controlling supply of reheated steam from said high pressure turbine to an intermediate or low pressure turbine, and a further pair of simultaneously operable valves for astern running or manoeuvring, one of said last mentioned valves controlling supply of superheated steam to said reheater and the other controlling supply of said steam from the reheater to an astern turbine.

5. An elastic fluid power installation as claimed in claim 1 in combination with means for automatically controlling the means for reducing heating of the reheater in accordance with the temperature of the steam entering or leaving the reheater.

6. An elastic fluid power installation as claimed in claim 1 in which the means for directing the steam to the astern turbine includes a valve of the double shut-off with leak-off type controlling the supply of reheated steam to the astern turbine.

STANLEY SMITH COOK.
LOUIS MORTIMER DOUGLAS.